United States Patent [19]
Parkinson et al.

[11] 3,929,005
[45] Dec. 30, 1975

[54] ULTRASONIC INSPECTION RECESS IN HEAT EXCHANGER AND NUCLEAR STEAM GENERATOR TUBESHEETS

[76] Inventors: John K. Parkinson, 65 Dunvegan Road, St. Catharines; Anthony Ruhe, 168 S. Pelham St., Fonthill, both of Ontario, Canada

[22] Filed: Aug. 1, 1974

[21] Appl. No.: 493,598

[52] U.S. Cl. ................................. 73/67.8
[51] Int. Cl.² ............................... G01N 29/04
[58] Field of Search........ 73/67.8 S, 67.8 R, 67.5 R, 73/67.6, 67.7, 67.9, 71.5 (U.S.)

[56] References Cited
UNITED STATES PATENTS
3,066,525  12/1962  Harris ........................ 73/67.5 R X FOREIGN PATENTS OR APPLICATIONS
1,600,873  9/1970  France ............................ 73/67.8 S Primary Examiner—James J. Gill

[57] ABSTRACT

A vessel with a butted weld seam is provided with an access slot in its surface at a selected distance from the weld seam. An ultrasonic probe engages with a wall of the slot which is aligned with the weld and signals generated by the probe cross the axis of the weld frontally without substantial reflection from adjacent vessel surfaces.

5 Claims, 4 Drawing Figures

ULTRASONIC INSPECTION RECESS IN HEAT EXCHANGER AND NUCLEAR STEAM GENERATOR TUBESHEETS

BACKGROUND OF THE INVENTION

The invention relates to a method and apparatus for non-destructive ultrasonic inspection of weld seams in vessels and in particular vessels carrying substances therein, which, if discharged due to a weld failure, would cause disastrous effects.

One method presently used extensively is that of establishing an ultrasonic shear wavefront across the weld seam and detecting reflected signals therefrom which indicate possible failure points in the weld. Shortcomings in such a method are that frontal sonic beams cannot be used, vessel inspection points are limited to the outside once constructed, or filled and; testing is costly and time consuming to impliment, and correlation of the results of periodic testing procedure is difficult to compile.

When testing from a surface mis-alligned with the frontal axis of the weld, the ultrasonic probes utilized must be moved to different surface positions. The probe must be moved in order to scan the weld logitudinally as well as radially. Such a method requires an inordinate amount of time to implement and may not provide the accuracy that a fixed pattern scan would accomplish.

Another difficulty with testing a weld seam from mis-alligned surfaces, for example, the exterior portion of the vessel is that the external surface may be tapered where the materials meet or butt, thereby affecting the sonic reflections. The specific geometry of one such weld seam configuration is described with respect to FIGS. 1 and 2 in the attached drawings.

It is therefore an object of the present invention to provide a simplified and accurate method of inspecting a critical weld seam.

It is yet another object of the present invention to provide a method and apparatus for periodically checking the condition of such critical welds.

It is still another object of the present invention to provide a testing method and apparatus for establishing a frontal or normal wave across the weld without reflection from adjacent boundaries.

It is still another object of the present invention to provide a testing procedure that will yield uniform and predictable results.

It is yet another object of the present invention to provide a testing system wherein the testing apparatus may engage with the workpiece in a manner which is adaptable to automation techniques.

SUMMARY OF THE INVENTION

A system is provided for non-destructive ultrasonic testing of a vessel having a weld seam and an access slot for receiving an ultrasonic probe. The slot is provided with walls, one of which is aligned radially and longitudinally with the seam and the probe is engaged with the aligned wall for generating a wavefront which crosses the seam boundary in a frontal or almost normal direction. Ultrasonic signals are reflected from defects in the seam and received by the transducer without substantial interference or reflection from adjacent vessel surfaces. The probe may be moved longitudinally in the slot to scan the entire seam.

For a better understanding of the present invention together with other and further objects, reference is directed to the following description taken in connection with the accompanying drawings while its scope will be pointed out in the appended claims.

DESCRIPTION OF THE PREFERRED EMBODIMENT

Figure 1:
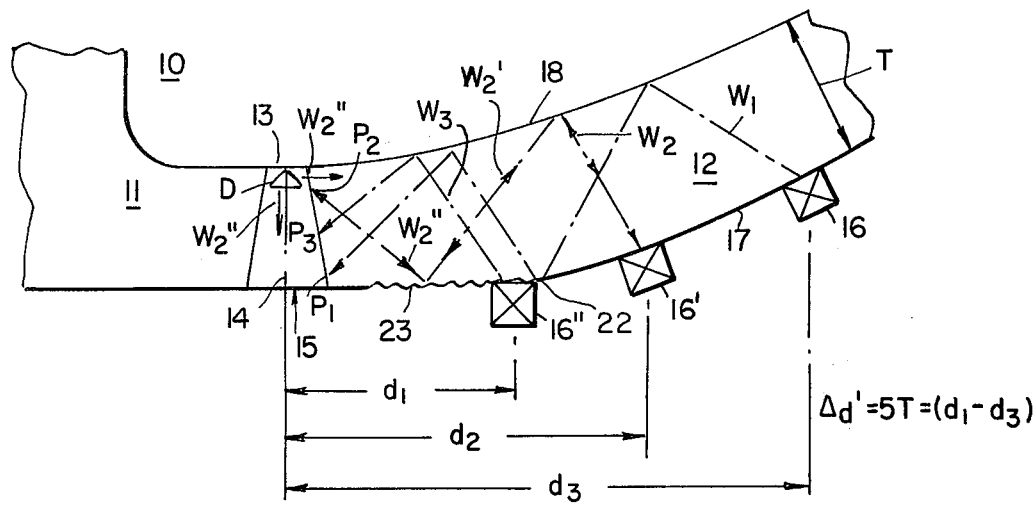
FIG. 1 is a cross-sectional view of a fragment of a vessel having a critical weld and a probe device illustrating the method of testing the seam in accordance with the prior art.
Figure 2:
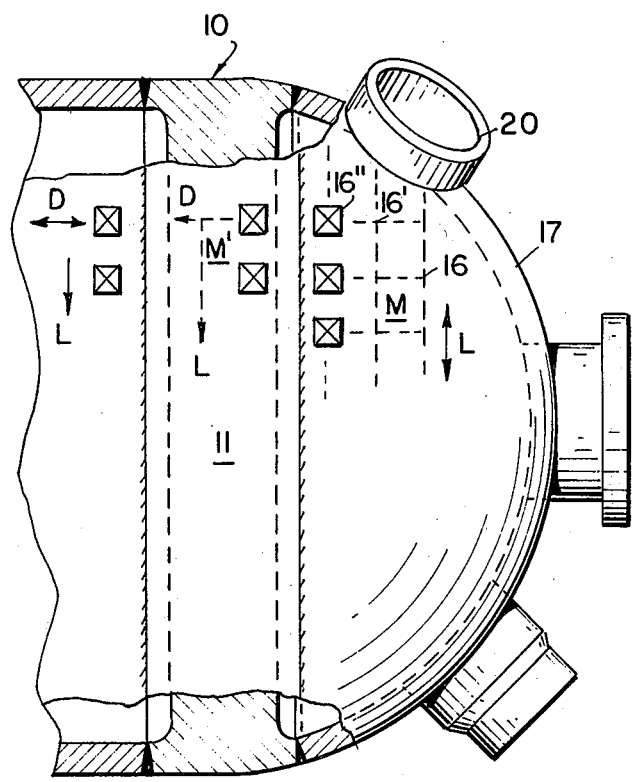
FIG. 2 is a longitudinal view of the apparatus shown in FIG. 1 illustrating another aspect of the prior art method.

The method of testing a critical weld in accordance with the prior art is illustrated in FIGS. 1 and 2. In FIG. 1, there is shown a fragment of a vessel 10 having walls 11 and 12 which are butt-welded at seam or weld 13. The weld 13 has a radial axis 14 normal to the surface 15 of the exterior of the vessel.

In order to test a seam 13 shown in FIG. 1, ultrasonic probe 16 is coupled by some suitable method (usually fluid coupling) with the surface 15 of the exterior of the vessel. The probe 16 generates an ultrasonic signal in accordance with the signals from an external source (not shown). The signals are in the form of ultrasonic wavefronts, for example, W1, W2, and W3. These wavefronts W1–W3 are reflected by surfaces 15 and 18 of the vessel. The wavefront W1 generated by the probe 16 is reflected by the walls of the vessel to cross the weld 13 boundary at a point P1.

The probe 16 may thereafter be moved toward weld 13 (left in the drawings) and then be activated as shown at 16' in phantom. The wavefront W2 set up by the probe at 16' engages with the weld boundary 13 at P2. Similarly, the probe at 16'' generates wavefront W3 which meets weld boundary 13 at P3.

As an example, it will be assumed that the weld is defective at Point D and one of the wavefronts W1–W3 crossing the defect D is affected thereby, a portion of the energy of the wave being reflected back towards the source. Defect D is shown in the path of wavefront W2, which, as illustrated, causes energy to reflect from the defect in the form of wavefront W2'. It should be understood, however, that the energy W2' reflected back may be reflected in a number of directions, and in fact is both dispersed and dissipated upon encountering Defect D. This is illustrated by the reflected energy W2'' indicating reflected or dissipated energy which will not be received by probe 16' effectively. The results of such testing is, therefore, not completely satisfactory.

In FIG. 2 there is shown a longitudinal view of the vessel 10 illustrating a matrix of test positions at which the probe 16 must be placed in order to obtain a reasonable scan across the entire weld 13. In FIG. 2, the probe 16 is placed at varying positions between 16' and 16'' in order to scan the weld radially.

If the weld is to be scanned longitudinally (direction L), the probe 16 must be placed at various levels as illustrated L1–L2–L3, so as to create a matrix M of test positions as illustrated.

In FIG. 2, the vessel is shown with a flange opening 20 which interferes with the pattern of matrix M, presenting an obstacle to the probe. The probe cannot be positioned to scan certain portions of the weld seam corresponding to the matrix position of flange 20. In such a case, it may be necessary to investigate the weld from the other side of the seam in that portion of the vessel 10 shown by the reference numeral 11. The probe 16 must be repositioned so as to scan the weld axially and laterally (see matrix M'). This test procedure is time-consuming and expensive but most importantly, it may not provide satisfactory results due in part to probe positioning, surface irregularities, and other limitations mentioned above. For example, without precise positioning of the probe 16 comparison of tests made at a later time is difficult to correlate, which is important in predicting possible failure.

Another difficult with the procedures of the prior art is that the exterior surface 15 of the vessel may not be uniform in thickness (e.g., see taper beginning at 22). The taper 22 results from manufacturing procedures and is most difficult to eliminate. The exterior dimension for the vessel wall 15 may exceed thickness specifications and therefore the butt-point where walls 11 and 12 meet may not be uniform. Tapering wall 12 smooths the butt-point and the taper is not machined but roughly shaped, resulting in only a moderately smooth surface. Further, the surface is not usually machined smoothly, increasing the difficulties of coupling a probe to the surface.

The taper in the surface of the vessel wall presents at least two problems. Firstly, the geometry of the vessel wall is somewhat discontinuous and not particularly predictable with respect to the reflection characteristics of the waves W1–W3. In addition, the waves W1–W3 may be dissipated by the roughened surface of the taper 22, thereby reducing the efficiency of the energy transmitted and reflected as well as generating interference. (See reference 23)

Yet another defect in the method the prior art is that the probe, since it must be moved for scanning the weld 13 radially, must travel through a distance of at least five times the thickness of the weld seam, thereby changing its propagation properties over the distance 5T. The distance $d3$ of probe 16 from weld 13 and $d1$ at 16'' may be substantial and increase the probability of error as the distance of the probe from the seam increases.

Figure 3:
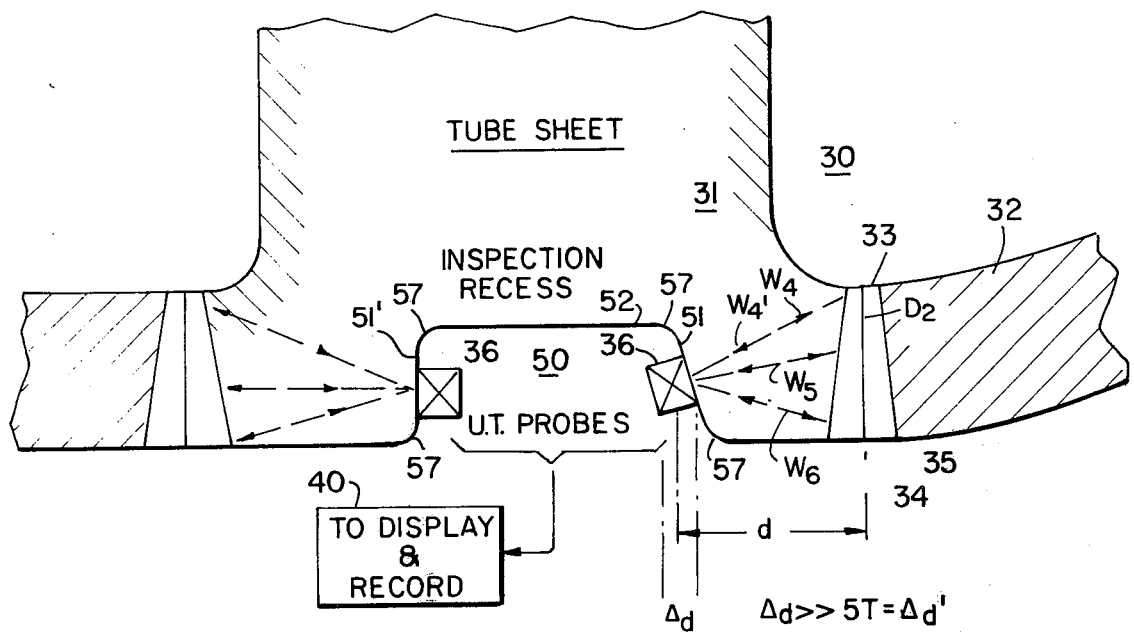
FIG. 3 is a cross-sectional view of a vessel having one or more critical seams utilizing the system as provided for in the present invention.
Figure 4:
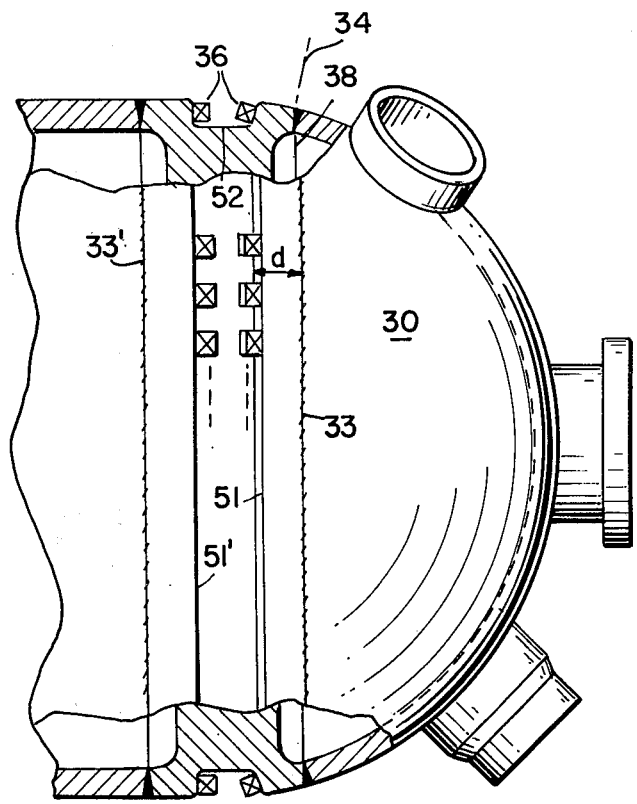
FIG. 4 is a longitudinal view of the testing system of the present invention.

In order to remedy the defects of the prior art, the vessel shown in FIG. 2 is modified in accordance with the illustrations of FIGS. 3 and 4. In FIG. 3, the vessel 30 is shown which is similar to the vessel 10 of FIGS. 1 and 2. The vessel 30 has the wall sections 31 and 32 which must butt as a previously described at seam 33. The seam 33 has a radial axis 34 normal to the wall surface 35 and a longitudinal axis 38 (FIG. 4).

The improvement of the present invention is that an inspection recess 50 is formed in the vessel wall 31 as shown. This inspection recess has wall surfaces 51'—51' and 52. The wall surface 51 is generally aligned with the radial and longitudinal axis 34 and 38, respectively, the ultrasonic probe 36 being similar to the one 16 shown in FIGS. 1 and 2.

In the present invention, probe 36 responds to an input signal of an external source (not shown) to generate wavefronts W4–W5–W6. The wavefront W5 is the main wavefront and the probe 36 may be designed to have multiple heads for generating a plurality of oblique wavefronts W4 and W6 so as to scan the entire radial axis of the weld 33 in one position. In this case, the distance of the probe 36 from the weld axis 34 is substantially uniform if the probe 36 is moved inwardly or outwardly of the inspection recess 50, $a\Delta d$ being very small with a reduced error margin. It can be readily understood that the $\Delta d$ for the system shown with the inspection recess 50 is very much smaller than the $\Delta d$ shown for the system of the prior art (i.e., $\Delta d' = 5T \gg \Delta d$).

Another advantage of the present system is that the wavefronts W4–W6 engage with the axis of the weld in a frontal or almost normal direction as opposed to the shear waves of the prior art. In this respect, less energy is lost by extraneous reflections from adjacent surfaces. Defect reflections (eg. W4') contain more effective energy to activate the probe 36 and establish a reliable reading.

It should be understood that the probe 36 need not be moved in order to scan the entire radial axis of the weld seam. If it becomes necessary, however, the position change is very slight and the process efficiency is substantially increased in terms of cost of operation and the time necessary for accomplishing the desired results.

Referring to FIG. 4, there is shown the vessel 30 of FIG. 3, which illustrates the operation of the testing procedure, wherein the probe 36 may be moved in the direction of the longitudinal axis 38 for examining the entire length of the seam 33. The probe 36 may be moved along the seam 33 at a fixed distance d over the entire length of the vessel so as to provide a uniform longitudinal scan of the entire weld.

This procedure is much simpler than that described with respect to FIG. 2 wherein it is required to position the probe 16 at different positions over matrix M.

It should be understood that in providing the access slot 50 of the present invention, it is possible to scan two welds simultaneously as illustrated in FIG. 4. The weld 33 under discussion and another weld 33' in an adjacent section of the vessel may be examined simultaneously if two probes are used and engage with the appropriate walls 51 and 51' for the respective welds 33–33'. It is clear that a cradle or other mounting means may be utilized to hold both probes and move them longitudinally along the slot to obtain simultaneous readings for two welds 33 and 33', thereby increasing the efficiency of the system. As a matter of fact, any adjacent weld could be inspected simultaneously if the slot were configured so as to adjoin and provide a frontal path for inspection for the weld under consideration.

Display and recording equipment 40 may be utilized to monitor the test procedure and permanently record the seam condition so that a "finger print" may be made for comparison at a later time.

The vessels described herein are designed for use as heat exchangers in a nuclear reactor system. The fluids carried in the chambers of the vessels are extremely dangerous, therefore, the reliability of the weld is critically important. In order to avoid the disastrous effects of weld failure both in terms of human safety and cost of repair, the method and apparatus of the present invention has been developed.

In operation, the method of the present invention is conducted, such that, when the vessel is constructed, a notch or access slot 50 is cut, or cast in the surface of the vessel 30 with sufficiently smooth walls to provide a working surface for the probes 36. The probes are inserted against the appropriate wall of the slot and a signal is generated such that a frontal or normal wave crosses the axis of the weld directly without substantial reflection from adjacent surfaces of the vessel. Defects in the weld reflect a portion of the energy of the impinging wave towards the transducer probe for reception. Recovered ultrasonic signals are converted to an electrical signal and recorded by associated apparatus coupled with the probe, thereby "finger printing" the seam. The procedure is repeated longitudinally along the entire weld seam. After the entire seam is scanned, the results may be analyzed in order to determine whether or not the reflected signals indicate any defects in the weld. Defects within specification limits which are recorded may be compared with later tests which are performed periodically in the manner described.

It should be understood that if the seam has an irregular configuration, the slot may be cut in the vessel wall to conform to the configuration of the weld providing of course there is sufficient material in the vessel wall to provide the access slot or port without weakening the vessel. This may be accomplished by increasing the thickness of the vessel wall and cutting out the slot to provide the access for the ultrasonic probe.

It should be further understood that the slot that is provided in the vessel wall need not necessarily have walls which are perfectly aligned with the axis of the weld but merely closely aligned depending upon the geometry of the particular weld seam. Furthermore, in order to eliminate stresses which occur with a slotted surface, the corners, both interior and exterior 57, are rounded.

While there has been described, what at present is considered to be the preferred embodiment of the present invention, it will be obvious to those skilled in the art, that various changes and modifications may be made therein without departing from the invention, and it is intended in the appended claims to cover all such changes and modifications as fall within the true spirit and scope of the invention.

We claim:

1. An improved system for non-destructive ultrasonic testing of a vessel weld seam utilizing an ultrasonic probe for testing for possible defects in said weld seam of said vessel, wherein the improvement comprises: a vessel having a circumferentially extending exterior U-shaped access slot, said slot having a wall substantially aligned with the weld seam, said wall forming a working surface of the slot is engaged by said transducer for generating frontal ultrasonic signals which substantially uniformly cross an axis of the weld seam with substantially no reflection from adjacent surfaces, the ultrasonic transducer responsive to reflected signals from said weld seam which indicate possible weld seam defects, the transducer movable in said slot so as to permit a scanning of the entire weld seam said slot disposed about said vessel at a distance substantially uniform along the entire length of the weld.

2. The system as described in claim 1 wherein the wall of the slot aligned with the weld seam is sufficiently smooth to provide suitable working surface for ultrasonic coupling with the transducer and said transducer includes a fluid coupling with said wall.

3. The system as described in claim 2 wherein recording means is coupled to an output of said ultrasonic detector for recording the response of the said transducer to reflected signals from the weld seam in accordance with its position along said slot whereby the seam is fingerprinted for comparison with in service tests conducted at a later time.

4. A method of non-destructive ultrasonic testing of a weld seam in a vessel comprising the steps of: providing a U-shaped access slot in the vessel wall adjacent to the weld at a selected uniform distance from said seam and at a depth sufficient to receive an ultrasonic transducer probe, inserting said probe against a wall of said slot aligned with said seam, generating ultrasonic signals in said probe for setting up frontal wave patterns across said seam, receiving reflected signal from said weld seams indicative of a possible defect in said weld seam and analyzing said reflected signal to determine whether the reflected signal indicates a defect requiring correction moving the probe from one end of the slot to the other so as to scan the entire weld seam.

5. The method as described in claim 4 including the step of: recording said reflected signals and periodically repeating the aforementioned testing during in service operation and comparing the results so as to predict a possible failure in the weld.

* * * * *